(12) United States Patent
Donovan et al.

(10) Patent No.: US 8,870,326 B2
(45) Date of Patent: Oct. 28, 2014

(54) PRINTING NEAR SATURATION

(75) Inventors: David H. Donovan, San Diego, CA (US); Shilin Guo, San Diego, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 217 days.

(21) Appl. No.: 13/276,911

(22) Filed: Oct. 19, 2011

(65) Prior Publication Data

US 2013/0100192 A1 Apr. 25, 2013

(51) Int. Cl.
*B41J 2/205* (2006.01)
*H04N 1/60* (2006.01)
*H04N 1/54* (2006.01)

(52) U.S. Cl.
CPC ............... *H04N 1/54* (2013.01); *B41J 2/2056* (2013.01); *H04N 1/6025* (2013.01)
USPC .......................................................... 347/15

(58) Field of Classification Search
None
See application file for complete search history.

(56) References Cited

U.S. PATENT DOCUMENTS

| 7,168,784 | B2 * | 1/2007 | Donovan et al. ............... 347/41 |
| 7,564,604 | B2 | 7/2009 | Shirasawa |
| 2004/0035320 | A1 * | 2/2004 | Sano et al. ................. 106/31.6 |
| 2005/0140997 | A1 * | 6/2005 | Shirasawa .................... 358/1.9 |
| 2009/0033961 | A1 * | 2/2009 | Tamagawa ................... 358/1.9 |
| 2013/0029116 | A1 * | 1/2013 | Mann et al. .................. 428/201 |

FOREIGN PATENT DOCUMENTS

JP 2001277552 A * 10/2001 ............... B41J 2/21

* cited by examiner

*Primary Examiner* — Geoffrey Mruk
*Assistant Examiner* — Bradley Thies

(57) ABSTRACT

A printer is disclosed in one example. The printer controls the amounts of the inks that are used when printing. The printer prints colors near saturation onto a media using mostly a first ink and prints saturated colors onto the media using mostly a second ink. The second ink has a reduced loading of the colorant in the first ink.

13 Claims, 2 Drawing Sheets

PRINTING NEAR SATURATION

BACKGROUND

Existing printing methods for printing near the black point of the color gamut with multiple inks may lack a sufficiently dark black or may causes visible steps in darkness near the black point.

DETAILED DESCRIPTION

Figures 1, 3A:
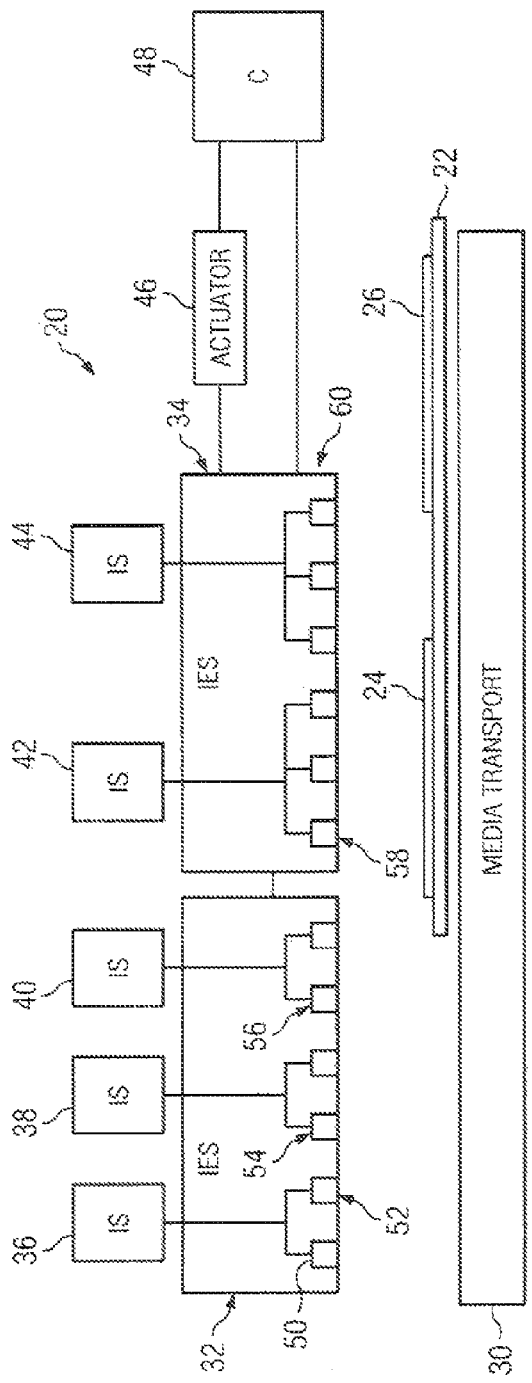
FIG. 1 is a schematic illustration of a printing system according to an example embodiment of the invention.
FIG. 3A is a table mapping color values to ink used in an example embodiment of the invention.
Figure 2:
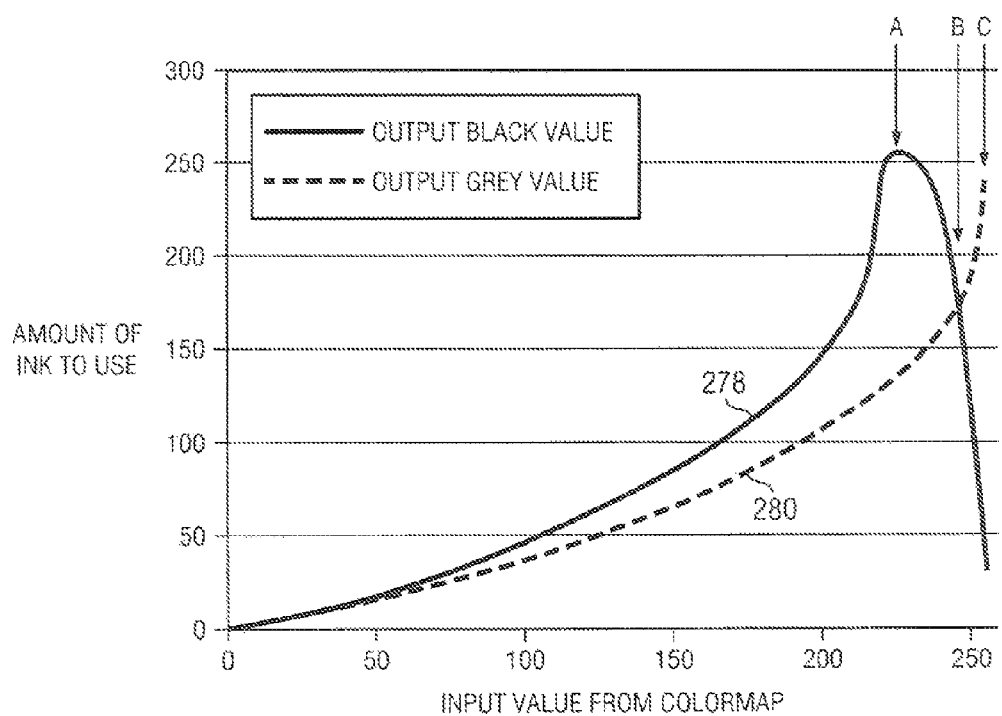
FIG. 2 is a graph showing the linearization table for black and grey inks in an example embodiment of the invention.

FIGS. 1-3, and the following description depict specific examples of the invention. For the purpose of teaching inventive principles, some conventional aspects have been simplified or omitted. Those skilled in the art will appreciate variations from these examples that fall within the scope of the invention. The features described below can be combined in various ways to form multiple variations of the invention. As a result, the invention is not limited to the specific examples described below, but only by the claims and their equivalents.

FIG. 1 schematically illustrates a printing system 20 according to an example embodiment. Printing system 20 is configured to deposit one or more printing inks or ink upon a print medium 22 to form images such as graphics or photos. As will be described hereafter, printing system 20 forms images having a sufficiently dark black point as well as other enhanced properties.

Printing system 20 includes media transport 30, ink ejection systems 32, 34, ink supplies 36, 38, 40, 42, 44, actuators 46 and controller 48. Media transport 30 comprises one or more devices configured to move and position print medium 22 with respect to ink ejection systems 32, 34. In one embodiment, media transport 30 may be configured to move individual sheets of media. In another embodiment, media transport 30 may be configured to move a web of media. In one embodiment, media transport 30 include media contacting and engaging mechanisms such as rollers, belts and the like which position media upon a platen opposite the ejection systems. In another embodiment, media transport 30 may comprise a cylinder or drum about which the sheet or web of print media is supported.

Ink ejection system 32, 34 comprise mechanisms configured to selectively eject or deposit printing ink onto print medium 22. In one embodiment, each of ink ejection systems 32, 34 includes a multitude of nozzles 50 through which ink is ejected. In the example illustrated, ink ejection system 32 includes a first set 52 of nozzles 50 (the number and configuration of which are schematically shown) for ejecting ink provided by ink supply 36 and a second set 54 of nozzles 50 for ejecting ink supplied by ink supply 38 and a third set of nozzles 56 for ejecting ink supplied by ink supply 40. Likewise, ink ejection system 34 includes a first set of nozzles 58 for ejecting ink supply by ink supply 42 and a second set of nozzles 60 for ejecting ink supplied by ink supply 44. According to one embodiment, each of ink ejection systems 32, 34 comprise thermoresistance inkjet print heads. In another embodiment, each of ink ejection systems 32, 34 may comprise other ink ejecting mechanisms such as resistive inkjet print heads. Although the sets 52-60 of nozzles 50 are illustrated as being apportioned among the two ink ejection systems 32, 34, in other embodiments, these sets 52-60 of nozzles 50 may alternatively be provided by a single ink ejection system or be apportioned among greater than two ink ejection systems.

Ink supplies 36-44 deliver or supply ink to the nozzles 50 of ink ejection system 32, 34. In one embodiment, ink supply 36-44 may comprise cartridges; tanks or other containers remote from fluid ejection systems 32, 34, wherein a tube or other conduits delivers ink from the ink supply to the fluid ejection system. For example, in one embodiment, ink supplies 36-44 may comprise "off-axis" ink supplies. In another embodiment, ink supplies 36-44 may comprise compartments or chambers mounted to or provided as part of ink ejection systems 32, 34. For example, in one embodiment, ink ejection systems 32, 34 and their associated ink supplies 36-44 may be provided by one or more integrated cartridges having both nozzles 50 and one or more of the fluid supplies 36-44.

In the example illustrated, ink ejection system 32 and its associated ink supplies 36-40 supply and eject different chromatic inks onto print medium 22. In the example illustrated, ink supplies 36, 38 and 40 supply cyan, magenta and yellow inks, respectively to nozzles sets 52-56 of ink ejection system 32. In other embodiments, ink ejection system 32 may be provided with additional nozzles sets and may be supplied with different or additional chromatic inks from additional ink supplies. Examples of additional or alternative chromatic inks include light or dark yellow, light or dark cyan or light or dark magenta inks. In the example illustrated, each of the chromatic inks supplied by ink supply 36-40 are pigment-based inks. In other embodiments, the inks of supplies 36-38 may alternatively be dye-based inks. In embodiments where printing system 20 does not print color images, ink ejection system 32 and ink supplies 36-40 may be omitted.

Ink supplies 42, 44 supply different pigment-based inks which are deposited by sets 58, 60 of nozzles 50, respectively, such that the different pigment-based inks may be applied on top of one another or may be applied separately at each image dark portion to form dark or black portions of an image. In other words, rather than dark portions of the image being formed from a single black ink, dark portions of the image may be formed from the two different pigment-based inks separately printed upon a media, one being a black ink and the other being a grayscale ink (including black ink and gray ink). In some embodiments, the black ink or grayscale ink may include a small amount of cyan or magenta, limited so as to not produce a substantial hue shift. As will be described hereafter, the particular combination of pigment-based inks supplied by ink supplies 42, 44 provide black portions of the image with improved contrast and dynamic range as well as having an improved (lower) L* min value. The manner by which the different pigment-based inks from ink supplies 42 and 44 are deposited is further controlled to further reduce the L* min value of the black portions of the image.

Actuator 46 comprises one or more mechanisms configured to move or scan ink ejection systems 32, 34 across or relative to media transport 30 as well as print medium 22. In one embodiment, actuator 46 may comprise a motor configured to drive a belt or cable couple to a carriage supporting ink ejection system 32, 34. As ink ejection systems 32, 34 are moved or scanned across a print medium 22, ink is ejected onto print medium 22. Between such scans, media transport 30 may further be indexing or moving media 22 in a direction substantially orthogonal to the direction which actuator 46 is moving ink ejection system 32, 34. In other embodiments, actuator 46 may have other configurations or may be omitted. For example, in embodiments where ink ejection systems 32, 34 are alternatively configured to completely span a dimension of print medium 22, such as with a page-wide-array printer, actuator 46 may be omitted.

Controller 48 comprises one or more processing units configured to generate control signals controlling and directing movement of print medium 22, movement of ink ejection system 32, 34 by actuator 46 (unless ink ejection systems 32, 34 are part of the page-wide-array) and the ejection of ink onto print, medium 22 by nozzles 50. Controller communicates with media transport 30, ink ejection system 32, 34 and actuator 46 in a wired or wireless fashion. By controlling the manner and amount in which the pigment-based inks supplied by ink supplies 42 and 44 are deposited, controller 48 may further reduce the black point or L* min value of the image pixel.

For purposes of this application, the term "processing'unit" shall mean a presently developed or future developed processing unit that executes sequences of instructions contained in a memory. Execution of the sequences of instructions causes the processing unit to perform steps such as generating control signals. The instructions may be loaded in a random access memory (RAM) for execution by the processing unit from a read only memory (ROM), a mass storage device, or some other persistent storage. In other embodiments, hard wired circuitry may be used in place of or in combination with software instructions to implement the functions described. For example, controller 48 may be embodied as part of one or more application-specific integrated circuits (ASICs). Unless otherwise specifically noted, the controller is not limited to any specific combination of hardware circuitry and software, nor to any particular source for the instructions executed by the processing unit.

The inks in ink supplies 36-44 may contain pigments in a liquid vehicle or carrier medium as well as a binder. In addition to a binder, the carrier medium of ink may comprise additional additives or ingredients such as surfactants, dispersants, pH adjusters, buffers, humectants, antioxidants, solubilizers, ultraviolet absorbers, anti-corrosion additives, anti-kogation additives, or biocides. The pigments are generally insoluble in the carrier medium of the inks, but are typically dispersed/suspended in the form of small particles.

The ink in ink supply 42 may have the same pigment as the ink in ink supply 44, but will have a different ratio of pigment to binder. The ratio of pigment to binder is also known as the color loading of the pigment or colorant. In other embodiments, the ink in ink supply 42 may have a different pigment than the ink in ink supply 44. In addition, other aspects of the liquid carrier of the ink contained in ink supply 44 (besides a ratio of binder to pigment) may be different from the ink contained in ink supply 42. For example, in one embodiment, ink in ink supply 44 has an acrylic and polyurethane based binder. In one example embodiment of the invention, the inks in ink supplies 42 and 44 both have carbon black as the pigment. The ink with a lower loading of the colorant will look grey and the ink with the higher colorant loading will look black. Using two inks with the same pigment or colorant but with different loadings of the colorant is typically called dual loading.

When printing with black and grey inks (dual loading of the black pigment) on smooth glossy media, such as photographic paper, maximizing, the use of the grey ink and minimizing the use of the black ink at the black point produces the darkest glossiest blacks. This is because the surface smoothness and reflectivity of the printed ink are as important as the absorptivity of the ink in producing the smallest reflection of light from a dark surface. Grey ink printed on a smooth glossy media will produce a smoother surface than black ink printed on the same smooth glossy media. Large amounts of the grey ink are used at the black point to create the dark black color. By using large amounts of grey ink, the total absorptivity of the grey ink will be similar to black ink.

Using large quantities of grey ink when printing dark colors near the black point may create image quality problems due to the total amount of ink used, where the total amount of ink used is the sum of the grey ink, the black ink and the colored ink. Therefore it is advantages to print dark colors near the black point using mostly black ink. In one example embodiment of the invention, there will be a rapid change in the use of grey and black inks near the black point of the color map. Mostly grey ink will be used when printing at or very close to the black point of the color map and mostly black ink will be used when printing dark colors near the black point of the color map.

FIG. 2 is a graph showing the linearization table for black and grey inks in an example embodiment of the invention. The vertical axis is the amount of ink to use. The horizontal axis is the 8 bit input value from the color map, running from a value of 0 for white to 255 for black. In some example embodiments the input or output values may be larger than 8 bits, for example 10 or 12 bits. Typically the colormap output values are 8 bits while the linearization out values are 12 bits. Line 278 is a plot for the black ink and line 280 is a plot for the grey ink. The amount of grey ink used increases as the input value from the color map goes from white (zero) towards black (255). The amount of grey ink used reaches a maximum amount at location C which is the black point for the color map (255).

The amount of black ink used increases at first as the input value from the color map goes from white (zero) towards black. The amount of black ink used reaches a maximum at location A corresponding to an input value of 228. The input value of 228 corresponds to a dark color near the black point of the color map (255). More black ink is used than grey ink when printing these dark colors. As the input value increase past 228 and starts to draw very near to the black point, the amount of black ink used drops rapidly. At location B, the cross over point corresponding to an input value of 249, the amount of grey ink used surpasses the amount of black ink used. At the black point (255) almost all the ink used is grey ink with a little black ink. The ratio between the amount of black ink and grey, ink used between the dark colors and the black point, as well as the crossover point, may change depending on the printer, the media type, the ink composition, and the like. Each ink (black and grey) receives its own independent input value to this table from the colormap.

FIG. 3A is a table mapping color values to ink used in an example embodiment of the invention. The first three columns labeled RGB are the color values in RGB space. For clarity there are only a small number of color values shown in the table in the black and near black (NB) range. In an actual table there will be more values. Color maps are large beasts—for 8 bit RGB values, there are 16 million possible colors. It is generally prohibitive to directly specify all these RGB colors. So every N'th R,G, and B value of the table (often every 16th) is specified, and linear interpolation is used to generate the intermediate values between the values that are specified. In FIG. 3A the values shown in bold are the actual values listed in the table and the values shown non-bold are the linear interpolated values.

The black color value may correspond to RGB values of 0, 0, 0. The near black color value may correspond to the RGB values 36, 36, 36 (in 8 bit space). The number of steps between the black color value and the near black color value may vary. In FIG. 3A the fourth and fifth columns labeled Black and Grey are the colormap output values for black and grey. The sixth and seventh columns labeled Black and Grey are the ink values from the linearization table that correspond to the given RGB colormap input values. The last column is the total amount of ink used which is the sum of the black and grey ink used. For the black color value (RGB 0, 0, 0) the colormap output value for black is 255 which corresponds to an actual black ink value of 31. For the black color value (RGB 0, 0, 0) the Grey colormap output value is also 255 which corresponds to an actual grey ink value of 239.

For the near black color value (RGB 36, 36, 36) the black colormap output value is 212 which corresponds to a black ink value of 174. For the near black color value (RGB 36, 36, 36) the grey colormap output value is 0 (zero) which corresponds to a grey ink value of 0 (zero).

Figure 3B:
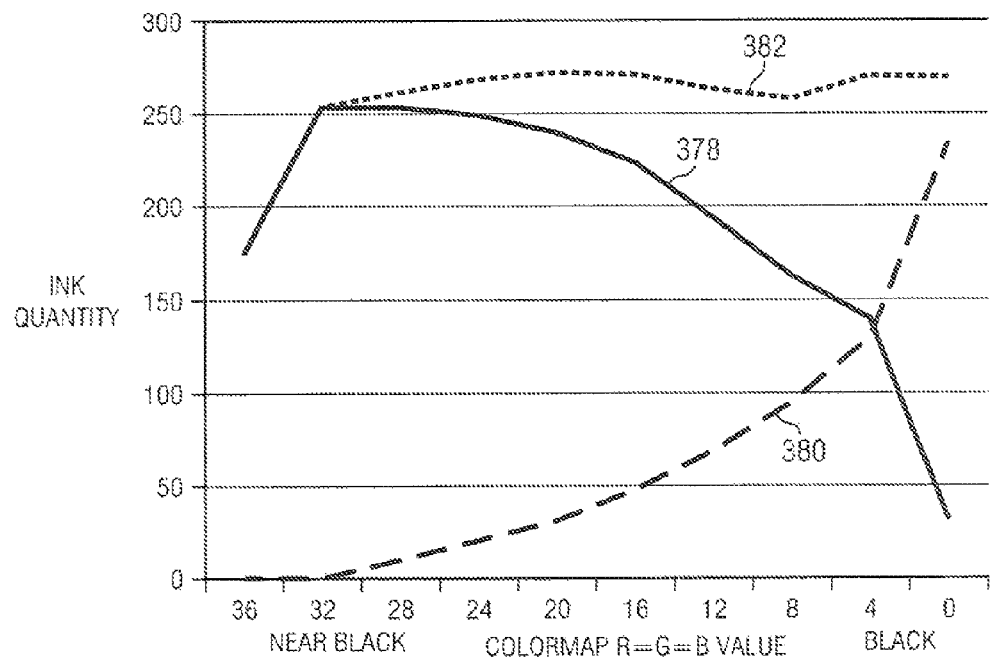
FIG. 3B is a plot of the amount of black and grey ink used for the color values between the black point and near black in an example embodiment of the invention.

FIG. 3B is a plot of the amount of black and grey ink used for the colormap values between the black point and near black in an example embodiment of the invention. The horizontal axis is the color value from near black (RGB 36, 36, 36) to black (RGB 0, 0, 0). The vertical axis is the amount of ink to use running from zero to the maximum amount. Line 380 is the plot for grey ink, line 378 is the plot for black ink and line 382 is the plot for the sum of the black and grey ink. The amount of grey ink used starts at zero for the near black (NB) color. As the color value moves from NB towards the black point the amount of grey ink used increases towards the maximum amount. At the black point color value the maximum amount of grey ink is used. The amount of black ink used starts near the maximum value for the NB color value. As the color value moves from NB towards the black point the amount of black ink used decreases towards zero. At the black point color value the amount of black ink used is near zero. Line 382 is the total amount of ink used. Line 382 shows that the sum of the amount of grey and black inks used remains fairly constant from the near black color value to the black point color value.

The number of steps between the black color value and the near black color value may vary. The number of steps between near black and black may be empirically chosen by trial and error. The particular input value that defines the near black value is arbitrary. The near black value will be chosen such that there are enough entries before the near black value and after the near black value that ink quantities can be controlled in a smooth and predictable fashion. It is most likely that the number of values before the near black value will be considerably greater than the number of values after the near black value. The shape of the curve for the amount of black ink to use in between the near black color value and the black point may also be chosen by trial and error, or calculated to create a constant or near-constant total ink sum after determining the amount of grey ink the normal color map and the grey linearization table will produce for near black colors.

In the examples above, dual loading of a black colorant was described. However, in other example embodiments of the invention, dual loading of chromatic colorants may be used. When dual loading the black colorant, the switch between using mostly black ink and using mostly grey ink starts at dark colors near black. When dual loading chromatic colorants, the switch between using the ink lightly loaded with the chromatic colorant and using the ink fully loaded with the chromatic colorant will start near the saturation point for that colorant. Of course the saturation point for the black colorant is black. Therefore the general case is having the switch between using the ink lightly loaded with a colorant and using the ink fully loaded with the colorant will start near the saturation point for that colorant.

What is claimed is:

1. A printer, comprising:
a controller to control an amount of ink printed onto a medium by a plurality of nozzles;
a first set of the plurality of nozzles printing a first ink with a first loading of a colorant;
a second set of the plurality of nozzles printing a second ink with a second loading of the colorant, wherein the second loading is a reduced loading with respect to the first loading;
the controller printing colors near saturation using both inks and more of the first ink than the second ink, and printing saturated colors using both inks and more of the second ink than the first ink.

2. The printer of claim 1, wherein the first ink is a black ink and the second ink is a grey ink and the colorant is carbon black.

3. The printer of claim 1, wherein a total amount of ink used remains approximately constant when printing colors between the colors near saturation and saturated colors, wherein the total amount of ink used is an amount of the first ink used plus an amount of the second ink used.

4. The printer of claim 1, wherein a color map look up table is used to select the amount of the first and second inks to use for each color printed.

5. The printer of claim 4, wherein the color map look up table is an 8 bit table and there are at least 16 steps between colors near saturation and a saturation point.

6. The printer of claim 1, wherein the printer is an inkjet printer.

7. The printer of claim 1, wherein a near black color is defined as the lightest color of the colors near saturation, and wherein the near black color is chosen to allow printed amounts of the first and second inks to be smoothly varied over the range of the colors near saturation and the saturated colors.

8. The printer of claim 7, wherein the range of colors printable by the printer that are lighter than the near black color is greater than the range of colors printable by the printer that are darker than the near black color.

9. The printer of claim 1, wherein the printing saturated colors using both inks and more of the second ink than the first ink minimizes the L* min value of a black printed portion of the media.

10. A printer comprising:
a means for printing a first ink onto a media and a means for printing a second ink onto the media, the second ink having a reduced loading of a colorant in the first ink;
a means for controlling an amount of the first ink used and for controlling an amount of the second ink used when printing different colors;
the means for controlling printing colors near saturation using both inks and mostly the first ink, and printing saturated colors using both inks and mostly the second ink.

11. The printer of claim 10, wherein both inks have a same hue, and wherein the first ink has a darker color than the second ink.

12. The printer of claim 10, wherein a near black color is defined as the lightest color of the colors near saturation, and wherein the near black color is chosen to allow printed amounts of the first and second inks to be smoothly varied over the range of the colors near saturation and the saturated colors.

13. The printer of claim 10, wherein the means for controlling printing saturated colors using both inks and mostly the second ink minimizes the L* min value of a black printed portion of the media.

* * * * *